Patented Apr. 30, 1940

2,198,915

UNITED STATES PATENT OFFICE 2,198,915

DITHIOPHOSPHATE FLOTATION

Merrill W. MacAfee, Berkeley, Calif., assignor, by mesne assignments, to The Dow Chemical Company, Midland, Mich., a corporation of Michigan No Drawing. Application September 17, 1935, Serial No. 40,932

6 Claims. (Cl. 209—166)

This invention relates to the concentration of certain ores and minerals by froth flotation and comprises more particularly the concentration of such ores and minerals by means of certain new organic flotation reagents.

It has previously been shown that dithiophosphoric acid and the alkali metal salts thereof are good flotation agents. I have discovered that certain new organic dithiophosphates as well as some polythiodiphosphates are excellent flotation agents and enable the flotation of ores and minerals heretofore not successfully floated.

One object of my invention is to provide a class of flotation agents which not only possess the good flotation properties resulting from the presence of combined phosphorus and sulphur but which are chemically different from these and have properties equal to or better than these in flotation.

I have discovered that various organic dithiophosphates, as distinguished from metal dithiophosphates, constitute excellent flotation agents and possess certain desirable flotation properties. These new organic flotation agents have in general a molecular structure indicated by the following type formula:

$$\begin{array}{c} R_1O \diagdown \diagup OR_2 \\ P \\ \diagup \diagdown \\ S \quad SR_3 \end{array}$$

where $R_1$, $R_2$ and $R_3$ represent the same or different alkyl, aryl or acyl groups. Specific examples of this class are: The ethyl ester of ethyl dithiophosphoric acid, the secondary butyl ester of diethyldithiophosphoric acid as well as the secondary butyl ester of disecondary buty dithiophosphoric acid.

Aryl esters of alkyl or aryl dithiophosphates are also included such as phenyl ester of secondary butyl dithiophosphoric acid, the phenyl ester of diphenyl dithiophosphoric acid.

The aforementioned compounds can be made with the action of the appropriate alkyl, alkylene, acyl or aryl chlorides on the selected dithiophosphoric acid or a salt thereof, in a manner analogous to the treatment of xanthates and xanthic acid with the aforementioned chloride, as is well known in the art.

The acyl dithiophosphates have the following general line formula:

$$\begin{array}{c} R_1O \diagdown \diagup OR_2 \\ P \\ \diagup \diagdown \\ S \quad S-C-R_3 \\ \qquad\quad \| \\ \qquad\quad O \end{array}$$

where $R_1$ and $R_2$ represent alkyl or aryl groups and $R_3$ in the acyl radical C—O—R representing either a hydrogen radical or a substituted or unsubstituted hydrocarbon radical. Specific examples of this class are: Benzoyl disecondary butyl dithiophosphate, acetyl diethyldithiophosphate, benzoyl dipropyl dithiophosphate, benzoyl disecondary amyl dithiophosphate.

The method of preparing these acyl dithiophosphates may be illustrated by the following example: 248 grams of potassium disecondary butyl dithiophosphate in 1000 c. c. of ether are added to 280 grams of benzoyl chloride dissolved in 500 c. c. of benzene. The mixture is allowed to stand for several days during which it is frequently agitated. Thereafter the precipitated potassium chloride is filtered off and the filtrate evaporated, care being used not to heat the filtrate to too high a temperature.

Various other organic acid chlorides such as ethyl chlorocarbonate or carbonyl chloride can also be reacted with the substituted dithiophosphates to give such products as disecondary butyl dithiophospho ethyl formate.

I have also been able to produce various anhydrids of dithiophosphoric acid which I have found useful in flotation. As example of these I mention diethyldithiophosphoric anhydride dipropyl dithiophosphic anhydride, dibutyl dithiophosphic anhydride, disecondary butyl dithiophosphic anhydride, diamyl dithiophosphic anhydride, disecondary anyl dithiophosphic anhydride. Unsymmetrical anhydrides can also be prepared from mixtures of the corresponding unsymmetrical dithiophosphates or produced in mixtures by utilizing different dithiophosphoric acid.

The symmetrical anhydrides can in general be prepared by treating the appropriate metal dithiophosphate with a cyanogen chloride as is illustrated in the following equation:

$$2\left(\begin{array}{c} R_1O \diagdown \diagup S \\ P \\ \diagup \diagdown \\ R_2O \quad SM \end{array}\right) + CNCl \longrightarrow$$

$$\begin{array}{c} R_1O \diagdown \diagup S \quad S \diagdown \diagup OR_1 \\ P \quad\quad P \\ \diagup \diagdown \diagup \diagdown \\ R_2O \quad\quad S \quad\quad OR_2 \end{array} + MCl + MCNS$$

where $R_1$ and $R_2$ are the same or different alkyl, aryl or acyl radicals; where M is a metal, preferably an alkali metal.

The aforementioned phosphoric anhydrides can also be prepared as a by-product of the action of the corresponding acyl chlor formates and a metal dithiophosphate. For example ethyl dithiophosphic anhydride can be prepared by the action of ethyl chlor formate on potassium diethyldithiophosphate.

I have found that I am able to produce organic polythiodiphosphates which are useful in flotation and which contain more than four sulphur atoms. Such materials have the following structural formula generally:

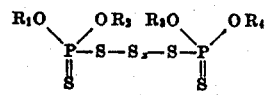

where $R_1$, $R_2$, $R_3$ and $R_4$ are the same or different organic radicals and $X$ is a small whole real number of a positive value of the order of one or more. These materials can be prepared by the action of a sulphur chloride such as sulphur mono chloride or sulphur dichloride. Since these materials are not exactly certain in their composition and since there is considerable discussion as to the structure and since sulphur is very soluble in sulphur chloride and at times appears to be present in a molecule as a poly sulphide nature having several loosely bound sulphur atoms in addition to those described by the formulas, I prefer to express the sulphur chlorides referred to herein as $S_xCl_2$ where $x$ is a small real whole number.

The reaction between the sulphur chloride and the dithiophosphate is an exothermic one and cooling is usually desirably effected during the course of the reaction. The reaction products are generally moderately viscous oil. For example, to a well agitated aqueous solution of sodium disecondary butyl dithiophosphate, sulphur chloride is slowly added while the mixture is agitated and the temperature is not allowed to exceed 15° C. The relative proportions of the reacting materials are two molecules of the dithiophosphate to one molecule of the sulphur chloride. When the reaction is complete a yellow oily layer will be found on the top of the aqueous mass and this is separated off, dissolved in a solvent and dried, the solvent being removed as by evaporation. The product is largely a hexathiophosphoric ester corresponding to the last general formula when $X$ is equal to 2.

In the following I show by way of example the utility of some of the compounds representative of this invention:

Example #1

A sample of McDonald Tailing Lease Grass Valley, California sands was ground wet to —100 mesh in a laboratory ball mill and floated for 5 minutes at 20% solids in a Kraut laboratory flotation machine making a rougher concentrate only and a finished tailing.

The reagents used were: Copper sulfate .10 lb./ton; sodium sulfide .10 lb./ton; 0.10 lb./ton of secondary butyl ester of disecondary butyl dithiophosphoric acid and 0.05 lb./ton of cresylic acid as a frother.

Test data

| Product | Weights, percent | Assays Au, ounces | Distribution Au, percent |
|---|---|---|---|
| Calc. head | 100.00 | .122 | 100.0 |
| Concentrate | 1.87 | 4.300 | 66.2 |
| Tailing | 98.13 | .042 | 33.8 |

Example #2

A sample of Crosby's Ophir Mine, Auburn, Calif. mine dump oxidized ore was ground wet to —100 mesh in a laboratory ball mill and floated for 4 minutes, at 20% solids in a Kraut laboratory flotation machine, making a rougher concentrate only and a finished tailing.

The reagents used were: Copper sulfate .10 lb./ton; sodium sulfide .10 lb./ton; benzoyl disecondary amyl dithiophosphate .10 lb./ton; cresylic acid .05 lb./ton.

Test data

| Product | Weights, percent | Assays Au, ounces | Distribution Au, percent |
|---|---|---|---|
| Calc. head | 100.00 | .329 | 100.0 |
| Concentrate | 2.30 | 11.810 | 82.6 |
| Tailing | 97.70 | .058 | 17.4 |

Example #3

A sample of mill feed from the Empress Mine, Grass Valley, Calif. was ground wet to —100 mesh in a laboratory ball mill and floated for 2 minutes, at 20% solids in a Kraut laboratory flotation machine. The rougher concentrate thus produced was cleaned once, making the following products, a finished concentrate, a middling and a final tailing.

The reagents used were: Ethyl dithiophosphoric anhydride 10 lb./ton; cresylic acid .05 lb/ton.

Test data

| Product | Weights, percent | Assays | | Distribution | |
|---|---|---|---|---|---|
| | | Au, ounces | Ag, ounces | Au, percent | Ag, percent |
| Calc. head | 100.00 | .273 | 2.40 | 100.0 | 100.0 |
| Concentrate | 1.80 | 10.810 | 107.40 | 71.6 | 80.5 |
| Middling | 6.30 | .939 | 6.90 | 21.6 | 18.3 |
| Tailing | 91.90 | .020 | .03 | 6.8 | 1.2 |

Example #4

A sample of mine ore from the Silver Queen Mine, Mojave, Calif. was ground to —200 mesh in a laboratory ball mill and floated for 5 minutes at 20% solids in a Kraut laboratory flotation machine. The rougher concentrate thus produced was cleaned once making the following products, a finished concentrate, a middling and a final tailing.

The reagents used were: Tetra secondary butyl polythiodiphosphate .05 lb./ton; cresylic acid .15 lb./ton.

Test data

| Product | Weights, percent | Assays | | Distribution | |
|---|---|---|---|---|---|
| | | Au, ounces | Ag, ounces | Au, percent | Ag, percent |
| Calc. head | 100.00 | 5.66 | .425 | 100.0 | 100.0 |
| Concentrate | .43 | 1184.68 | 82.018 | 90.1 | 83.0 |
| Middling | 5.63 | 1.84 | .367 | 1.8 | 4.9 |
| Tailing | 43.94 | .49 | .055 | 8.1 | 12.1 |

I claim:

1. As a composition of matter, an oily viscous liquid having most probably the general formula:

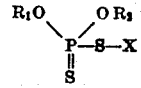

where $R_1$ and $R_2$ are the same or different alkyl, acyl or aryl radicals and $X$ is another alkyl or aryl radical free from sulphur or, if sulphur containing, having at least three sulphur atoms with at least two of said sulfur atoms bonded to a phosphorous atom.

2. As a composition of matter, an oily viscous liquid having most probably the formula:

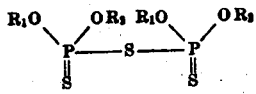

where $R_1$ and $R_2$ are the same or different alkyl, acyl or aryl groups.

3. In the process of concentrating precious metal ores by flotation, the step which comprises subjecting the ore in the form of a pulp to a froth flotation operation in the presence of a material whose molecular structure is that indicated by the following general formula:

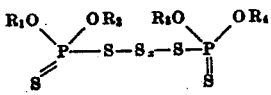

where $R_1$, $R_2$, $R_3$ and $R_4$ are the same or different alkyl or aryl radicals and $x$ is a small real whole number.

4. In the process of concentrating precious metal ores by flotation, the step which comprises subjecting the ore in the form of a pulp to a froth flotation operation in the presence of a material whose molecular structure is that indicated by the following general formula:

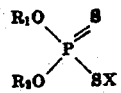

where $R_1$ and $R_2$ are the same or different alkyl, acyl or aryl radicals and $X$ is another alkyl, acyl or aryl organic radical free from sulphur or, if sulphur containing, having more than two S atoms with at least two of said sulphur atoms bonded to a phosphorous atom.

5. In the process of concentrating precious metal ores by flotation, the step which comprises subjecting the ore in the form of a pulp to a froth flotation operation in the presence of a material whose molecular structure is that indicated by the following general formula:

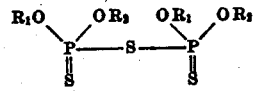

where $R_1$ and $R_2$ are the same or different alkyl, acyl or aryl radicals.

6. A process of concentrating precious metal ores by flotation as in claim 3 wherein the material present is of a molecular structure such that the value of $X$ is 2.

MERRILL W. MACAFEE.